United States Patent
Gopalakrishna et al.

(10) Patent No.: US 10,395,232 B2
(45) Date of Patent: Aug. 27, 2019

(54) METHODS FOR ENABLING MOBILE PAYMENTS

(71) Applicant: CA, INC., New York, NY (US)

(72) Inventors: Rajendra Gopalakrishna, Bangalore (IN); Tarun Agrawal, Bangalore (IN); Roshini Thyagaraj, Bangalore (IN)

(73) Assignee: CA, Inc., New York, NY (US)

( * ) Notice: Subject to any disclaimer, the term of this patent is extended or adjusted under 35 U.S.C. 154(b) by 1203 days.

(21) Appl. No.: 14/503,685

(22) Filed: Oct. 1, 2014

(65) Prior Publication Data

US 2016/0098698 A1 Apr. 7, 2016

(51) Int. Cl.
*G06Q 20/32* (2012.01)
*G06Q 20/20* (2012.01)

(52) U.S. Cl.
CPC ......... *G06Q 20/322* (2013.01); *G06Q 20/204* (2013.01); *G06Q 20/3276* (2013.01)

(58) Field of Classification Search
USPC .......... 705/16, 21, 59, 71; 380/44, 262, 278, 380/279
See application file for complete search history.

(56) References Cited

U.S. PATENT DOCUMENTS

| | | | |
|---|---|---|---|
| 8,559,639 B2 | 10/2013 | Hird | |
| 2010/0078472 A1* | 4/2010 | Lin | G06Q 20/32 235/379 |
| 2011/0137742 A1 | 6/2011 | Parikh | |
| 2012/0284535 A1* | 11/2012 | Asahara | G06F 21/608 713/193 |
| 2013/0048714 A1 | 2/2013 | Sharma | |
| 2013/0124855 A1 | 5/2013 | Varadarajan | |
| 2013/0226812 A1 | 8/2013 | Landrok | |
| 2013/0239104 A1* | 9/2013 | Savant | G06F 21/121 717/178 |
| 2013/0262309 A1 | 10/2013 | Gadotti | |
| 2014/0279474 A1* | 9/2014 | Evans | G06Q 20/3572 705/41 |
| 2015/0248664 A1* | 9/2015 | Makhdumi | G06Q 20/3274 235/380 |

* cited by examiner

*Primary Examiner* — Dante Ravetti
(74) *Attorney, Agent, or Firm* — Vierra Magen Marcus LLP (57) ABSTRACT

Methods for enabling secure online transactions using a mobile device are described. A mobile device may capture an image associated with a banking card in order to generate checkout information and to automatically populate checkout fields with the checkout information prior to completing an online transaction. In some cases, the mobile device may be used to select items to be purchased from an online merchant, access a checkout page of the online merchant for purchasing the selected items, acquire an image that encodes checkout information, acquire a personal code associated with an end user of the mobile device, generate the checkout information using the acquired image and the personal code, automatically populate one or more fields associated with the checkout page with the checkout information, delete the checkout information from the mobile device, and submit the checkout information to complete the purchase of the selected items.

14 Claims, 8 Drawing Sheets

FIG. 1

Mobile Device 141

METHODS FOR ENABLING MOBILE PAYMENTS

BACKGROUND

The present disclosure relates to systems and methods for enabling convenient and secure mobile payments.

Online shopping and other forms of electronic commerce allow consumers to purchase goods or services using the Internet. With the proliferation of tablets, laptops, smartphones, portable computers, and other mobile devices, end users are able to purchase a wide range of goods and services from an online merchant using their mobile devices without being tied to a particular geographic location. To make an online purchase, an end user may enter and submit payment information to the online merchant, such as credit card information, during an online checkout procedure using their mobile device. The payment information may correspond with a banking card issued to the end user. The payment information may include the card holder's name, the expiration date for the card, an account number associated with the card, and card verification information. Banking cards may include credit cards, debit cards, ATM cards, cash cards, pre-payment cards, and other cards issued to the end user by a banking institution or other institution acting to promote financial transactions (e.g., fuel cards for use at gas stations or transit cards for facilitating electronic transit fare payments). In some cases, during an online checkout procedure or other financial transaction, the end user may be required to enter a password or a personal identification number (PIN) in order for an online purchase to be authorized. PINs (or PIN codes) are typically generated by a card issuer (e.g., a card issuing bank) and sent to end users apart from the card (e.g., via email or traditional mail). PINs used to secure an online transaction may comprise static PINs that do not change over time or dynamic PINs that change over time (e.g., a new PIN may be used for every transaction).

BRIEF SUMMARY

According to one aspect of the present disclosure, technology for enabling convenient and secure mobile payments is disclosed.

In some embodiments, a mobile device may capture or acquire an image associated with a banking card in order to generate checkout information and to automatically populate checkout fields with the checkout information prior to completing an online transaction. The checkout fields may comprise data entry fields for providing checkout information to an online merchant. The checkout information may include credit card information (e.g., credit card numbers and expiration dates), a billing address, a shipping address, an email address of the purchaser, a phone number of the purchaser, shipping contact information, shipping method information (e.g., next day delivery or ground delivery), and answers to security questions specific to the purchaser. In one example, a mobile device may be used to select items (e.g., goods or services) to be purchased from an online merchant, access a checkout page of the online merchant for purchasing the selected items, acquire an image that encodes checkout information (e.g., an image printed on or attached to a banking card), acquire a personal code associated with an end user of the mobile device (e.g., a PIN or a user password), generate the checkout information using the acquired image and the personal code, automatically populate one or more fields associated with the checkout page with the checkout information in response to generating the checkout information, delete or remove the checkout information from the mobile device, and submit the checkout information to complete the purchase of the selected items.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

As will be understood by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for enabling secure online transactions using a mobile device (e.g., making an online purchase using a smartphone). In some embodiments, a mobile device may acquire an image associated with a banking card in order to generate checkout information and to automatically populate checkout fields with the checkout information prior to completing an online transaction. The checkout fields may comprise data entry fields for providing checkout information to an online merchant. The checkout information may include credit card information (e.g., credit card numbers and expiration dates), a billing address, a shipping address, an email address of the purchaser, a phone number of the purchaser, shipping contact information, shipping method information (e.g., next day delivery or ground delivery), and answers to security questions specific to the purchaser. In one example, a mobile device may be used to select items (e.g., goods or services) to be purchased from an online merchant, access a checkout page of the online merchant for purchasing the selected items, acquire an image that encodes checkout information (e.g., an image printed on or attached to a banking card), acquire a personal code associated with an end user of the mobile device (e.g., a PIN or a user password), generate the checkout information using the acquired image and the personal code, automatically populate one or more fields associated with the checkout page with the checkout information in response to generating the checkout information, delete or remove the checkout information from the mobile device, and submit the checkout information to complete the purchase of the selected items. The personal code may comprise a numeric value or an alphanumeric code. The mobile device may permanently delete or remove the checkout information prior to submitting the checkout information such that the personal information cannot be extracted from the mobile device after the selected items have been purchased.

In some cases, the image that encodes checkout information (or other sensitive information) may comprise a color image, a black and white image, an image including text, a color QR code, a black and white QR code, a two-dimensional color bar code, or a one-dimensional color bar code that includes lines of various colors. In one example, a color image or a color QR code may use eight different colors, wherein each color of the eight different colors may represent three bits of data. In another example, a color image may comprise a color data matrix using 16 different colors, wherein each color of the 16 different colors may represent four bits of data.

In one embodiment, a mobile device including an integrated camera or image sensor may automatically populate or enter information into one or more data entry fields associated with a webpage in response to acquiring a particular image that encodes the information (e.g., checkout information) and a personal code for decrypting the information from the particular image. The mobile device may comprise a smartphone, smartwatch, mobile phone, tablet, laptop, or other portable electronic devices. In another embodiment, a computing device (e.g., located at a retail store) may acquire an image that encodes information corresponding with a customer and automatically generate the information for the customer in response to acquiring the image and a personal code associated with the customer. The image that encodes the information may comprise a sticker, a sticker attached to a banking card, or an image that is attached to or integrated with a banking card.

In some cases, a card issuer (e.g., a card issuing bank) may acquire checkout information associated with a card holder (e.g., a shipping address, email address, credit card number, or billing address), encrypt the checkout information (e.g., using AES256 or triple DES), generate a user-specific encoded image that encodes the encrypted checkout information, and transmit or send the user-specific encoded image to the card holder. In some cases, the user-specific encoded image may be integrated with a banking card associated with the card holder. The decryption key for decrypting the encrypted checkout information may be protected via a personal code that is associated with the card holder. In one embodiment, the decryption key may comprise a PIN or a value derived from a user entered PIN. A PIN (or an authentication token) may be provided by an end user via a keypad, a virtual keyboard (e.g., entered using a touch-screen display of a mobile device), or a voice-based interface (e.g., speech recognition may be used to convert an end user's words into an alphanumeric code). Other forms of authentication tokens may be provided using biometric authentication (e.g., fingerprint recognition), facial recognition-based authentication, or voice-based authentication. In some embodiments, a software key container for generating or outputting the decryption key for decrypting the encrypted checkout information given an inputted personal code may be embedded within the image that encodes the encrypted checkout information. In one example, a first portion of the image may include data corresponding with the software key container and a second portion of the image different from the first portion may include different data corresponding with the encrypted checkout information.

In some embodiments, the decryption key for decrypting the encrypted checkout information (or other sensitive information) may be encrypted and stored in a key wallet or a software key container (e.g., a file, a portion of a file, a text string, or a binary string) using cryptographic camouflage techniques. Cryptographic camouflage techniques may be used to encrypt the decryption key (or a private key) such that any personal code entered (e.g., a six-digit PIN) to generate the decryption key looks like a possible good personal code. A benefit of using cryptographic camouflage techniques is that an attacker who gains access to the key wallet or software key container may not be able to easily perform a brute force attack in order to determine the correct decryption key. For example, if a malicious hacker gets a copy of the key wallet, then the hacker may try every combination of possible personal codes in order to release or generate the private decryption key. To resist this type of brute force attack, cryptographic camouflage techniques may configure the key wallet to generate data that looks like a possibly good decryption key given any personal code inputted to generate the decryption key (e.g., the key wallet may output data that appears to be in the proper from of a private key or a decryption key even when an incorrect personal code has been entered).

In one example, a key wallet for storing or generating a decryption key may be configured to receive an inputted PIN. If the inputted PIN is the correct PIN for unlocking the key wallet, then the correct decryption key may be outputted from the key wallet. However, if the inputted PIN is not the correct PIN for unlocking the key wallet, then an incorrect decryption key that has attributes of a possible decryption key is outputted from the key wallet. More information regarding key wallets and cryptographic camouflage techniques may be found in U.S. Pat. No. 8,559,639, "Method and Apparatus for Secure Cryptographic Key Generation, Certification and Use."

There are several approaches for making an online payment using a mobile device. In one approach, payment information may be remotely stored at an online merchant. However, this approach is typically used for only a handful of well-known and trusted online merchants. In another approach, the payment information may be stored locally on the mobile device. However, storing the payment information on the mobile device may be risky as the payment information could be misused if the mobile device is lost or stolen.

One issue with using a small mobile device to enter payment information that is required to complete an online purchase is that entering the payment information using a small form factor keypad or virtual keyboard is difficult and prone to data entry errors (e.g., typos). The difficulty in entering payment information by an end user of the small mobile device may result in failed transactions and frustration by the end user, which may result in the loss of business for online merchants. The inability for an end user to conveniently and securely enter payment details may prevent the end user from making online purchases using a mobile device. One benefit of utilizing an intelligent form filling application on a mobile device is that an end user of the mobile device may quickly and conveniently enter and submit sensitive information, such as checkout information for an online purchase or personal information. Moreover, an application running on a mobile device that extracts sensitive information from a captured image, automatically populates data entry fields with the extracted sensitive information, and then deletes the sensitive information from the mobile device eliminates the risk that the sensitive information may be stolen if the mobile device is lost or stolen.

Figure 1:
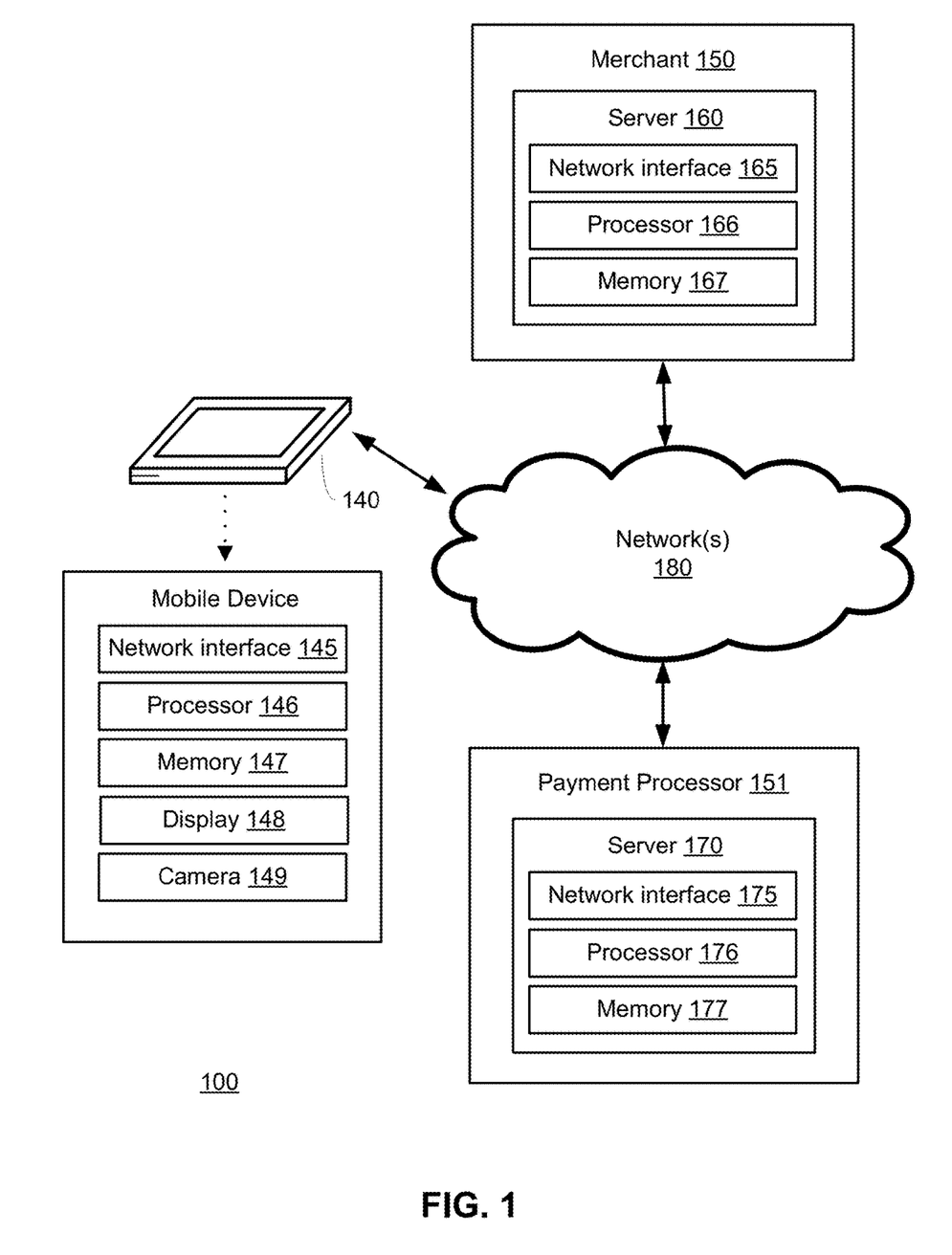
FIG. 1 is a block diagram of one embodiment of a networked computing environment.

FIG. 1 is a block diagram of one embodiment of a networked computing environment 100 in which the disclosed technology may be practiced. Networked computing environment 100 includes a plurality of computing devices interconnected through one or more networks 180. The plurality of computing devices may include mobile computing devices (e.g., a smartphone) and non-mobile computing devices (e.g., a desktop computer). The one or more networks 180 allow a particular computing device to connect to and communicate with another computing device. The depicted computing devices include mobile device 140, server 160, and server 170. The mobile device 140 may comprise a mobile phone, smart device (e.g., electronic watches, head-bands, and glasses), or tablet computer. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. The one or more networks 180 may include a cellular network, a mobile network, or a wireless network. Each network of the one or more networks 180 may include hubs, bridges, routers, switches, and wired transmission media such as a wired network or direct-wired connection.

One embodiment of mobile device 140 includes a network interface 145, processor 146, memory 147, display 148, and camera 149, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Processor 146 may include one or more processing units, such as one or more CPUs and/or one or more GPUs. Memory 147 may comprise one or more types of memory (e.g., RAM, SRAM, DRAM, ROM, EEPROM, Flash, etc.). Memory 147 may comprise a hardware storage device. Display 148 may comprise a touch-screen display. Camera 149 may include an image sensor for capturing images. Camera 149 may capture color images of an environment. The camera 149 may comprise an image capturing device for capturing one or more images of an environment or an object within the environment. The mobile device 140 may include outward facing cameras that capture images of the environment and/or inward facing cameras that capture images of the end user of the mobile device.

Server 160 may be associated with a merchant 150 (e.g., an online merchant) or used by the merchant 150 in order to allow end users of computing devices to purchase goods or services from the merchant 150. One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Memory 167 may comprise a hardware storage device.

In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

Server 170 may be associated with a payment processor 151 (e.g., a card payment processor) or used by the payment processor 151 in order to process credit card payments or to perform other financial transactions on behalf of an online merchant, such as merchant 150. One embodiment of server 170 includes a network interface 175, processor 176, and memory 177, all in communication with each other. Network interface 175 allows server 170 to connect to one or more networks 180. Network interface 175 may include a wireless network interface, a modem, and/or a wired network interface. Processor 176 allows server 170 to execute computer readable instructions stored in memory 177 in order to perform processes discussed herein. Processor 176 may include one or more processing units, such as one or more CPUs and/or one or more GPUs. Memory 177 may comprise one or more types of memory (e.g., RAM, SRAM, DRAM, ROM, EEPROM, Flash, etc.). Memory 177 may comprise a hardware storage device.

Networked computing environment 100 may provide a cloud computing environment for one or more computing devices. Cloud computing may refer to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In some embodiments, after an encoded image has been captured or acquired by a mobile device, such as mobile device 140, an application running on the mobile device may be triggered and decrypt the encoded image using a personal code. After the encoded image has been decrypted to obtain information encoded within the image, the application may automatically fill-in data entries associated with a webpage using the information encoded within the image without requiring actions to be performed by an end user of the mobile device. In one embodiment, the application may be embedded within an online merchant's buying webpage and automatically transmitted to the mobile device upon accessing the buying webpage. The online merchant may comprise a retail merchant or a wholesale merchant. In another embodiment, the application may be embedded within a payment gateway's buying webpage that is linked to an online merchant and automatically downloaded to the mobile device upon accessing the buying webpage. The payment gateway may correspond with a particular card payment processor (e.g., a third-party entity that is appointed by a merchant to handle credit card transactions or process credit card payments on behalf of the merchant).

The application may be downloaded or transmitted to the mobile device by transmitting code or an executable file associated with the application. In one example, the application may be downloaded via JavaScript and be executed by a web browser used by the mobile device to view a payment webpage. In some cases, the application may be stored on a computing device. For example, the application may be integrated with or be part of an operating system or a web browser used by the computing device. The application may be triggered explicitly by an end user of a computing device, by an online merchant's webpage, or by a web browser or operating system running on the computing device. In some cases, the application may be triggered by a web browser upon the identification of one or more data entry fields within a webpage displayed by the web browser (e.g., a credit card number data entry field or a billing address data entry field). In one embodiment, an automated form-filling triggering event (e.g., triggered by the application running on a mobile device or by an online merchant's webpage) may prompt an end user of a mobile device to enter a personal code, such as an ATM or debit card PIN. In some cases, the end user may be prompted to provide an authentication token or other authentication information, such as biometric information. The authentication information may be provided using biometric authentication (e.g., fingerprint recognition), facial recognition-based authentication, or voice-based authentication. Dynamic authentication using one-time-passwords may also be used. Once the personal code and an encoded image have been acquired, the application may decode the encoded image using the personal code, extract personal information from the decoded image, insert or enter the personal information into data entry fields for a webpage, and then cause the personal information to be submitted.

Figure 2:
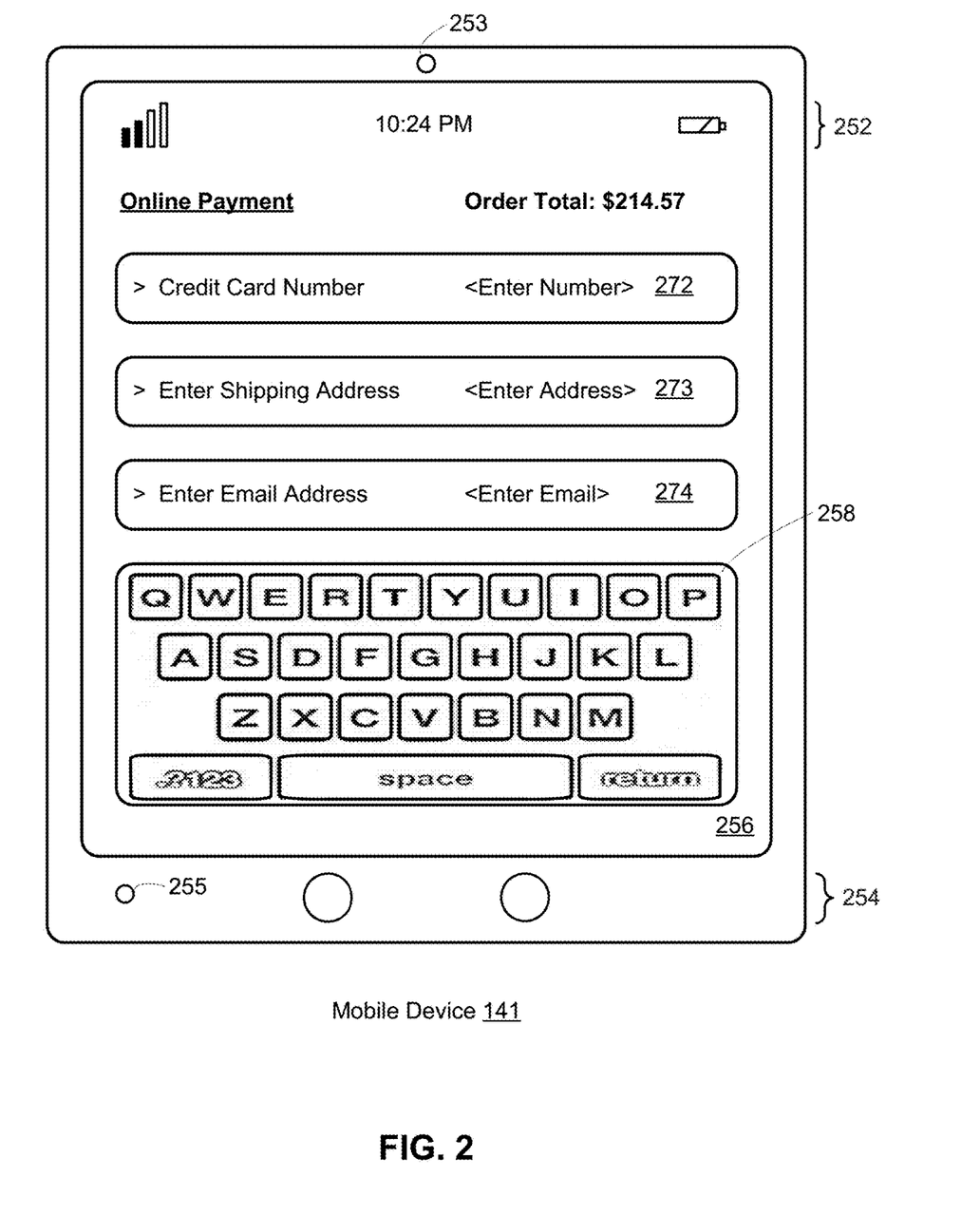
FIG. 2 depicts one embodiment of a mobile device.

FIG. 2 depicts one embodiment of a mobile device 141 that may be used for performing a financial transaction, such as making an online purchase of goods. The mobile device 141 may comprise a mobile device, such as mobile device 140 in FIG. 1. As depicted, mobile device 141 includes a touchscreen display 256, physical control buttons 254, a microphone 255, and a front-facing camera 253. The mobile device 141 may also include a rear-facing camera (e.g., located on the backside of the mobile device). The touchscreen display 256 may include an LCD display for presenting a user interface to an end user of the mobile device. The touchscreen display 256 may include a status area 252 which provides information regarding signal strength, time, and battery life associated with the mobile device. The microphone 255 may capture audio associated with the end user (e.g., the end user's voice) for determining the identity of the end user. The front-facing camera 253 may be used to capture images of the end user for determining the identity of the end user. The mobile device may include a web browser for loading and viewing webpages.

As depicted, the mobile device 141 displays data entry fields 272-274 associated with a checkout webpage of an online merchant for purchasing goods totaling $214.57. The data entry field 272 corresponds with a first field for entering a credit card number for making the purchase of goods. The data entry field 273 corresponds with a second field for entering a shipping address to which the purchased goods are to be shipped. Data entry field 274 corresponds with a third field for entering an email address to which an electronic receipt for the purchase may be transmitted. An end user of the mobile device 141 may enter data into the data entry fields 272-274 using a virtual keyboard 258. The virtual keyboard 258 may be invoked automatically by the mobile device or by a selection by the end user of a particular entry field of the data entry fields 272-274.

Figure 3A:
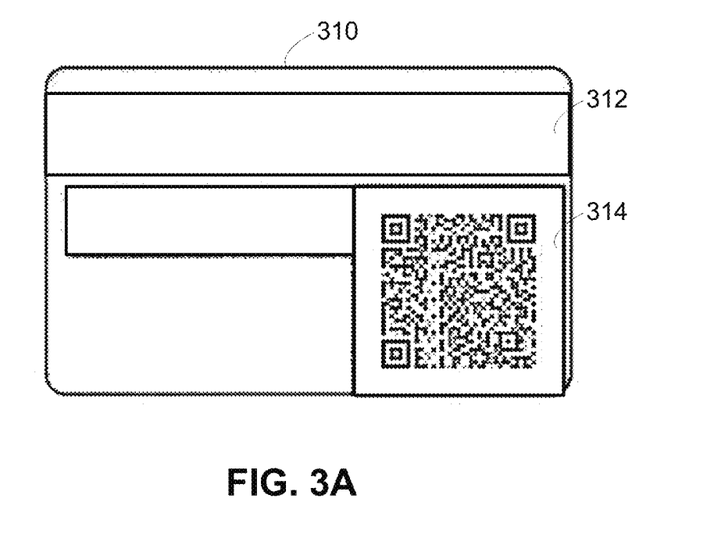
FIG. 3A depicts one embodiment of a banking card.

FIG. 3A depicts one embodiment of a banking card 310. The banking card 310 may comprise a plastic credit card, a debit card, or an ATM card. The banking card 310 includes a magnetic strip 312 and an image 314. The image 314 may comprise a color image, a black and white image, an image including text, a color QR code, or a black and white QR code. In one example, the image 314 may comprise a color QR code using 32 different colors, wherein each color of the 32 different colors may represent five bits of data.

Figure 3B:
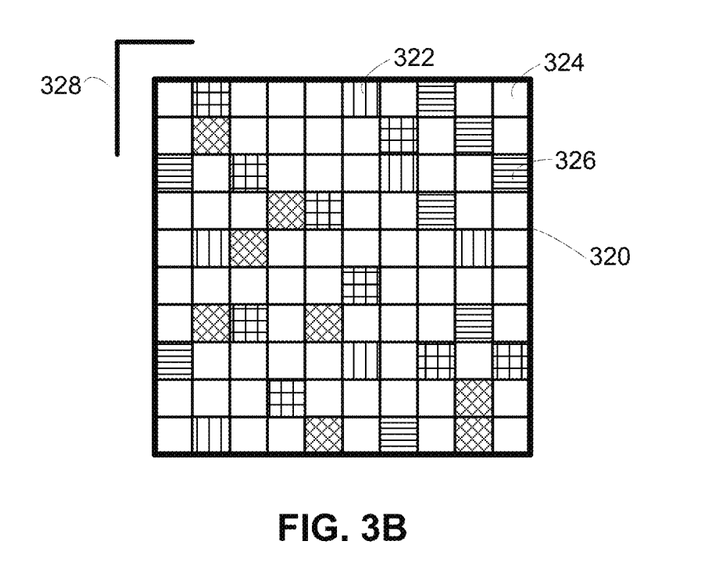
FIG. 3B depicts one embodiment of a color image that encodes information.

FIG. 3B depicts one embodiment of a color image 320 that encodes information. The color image 320 may include a plurality of colored squares, rectangles, or colored regions. A first colored region 324 of a plurality of colored regions may be colored a first color. A second colored region 322 of the plurality of colored regions may be colored a second color different from the first color. A third colored region 326 of the plurality of colored regions may be colored a third color different from the first color and the second color. In some cases, an alignment marker 328 may be used to determine an orientation of the color image 320. In one embodiment, the color image 320 may be captured using a camera or image sensor and the information encoded within the color image 320 may be extracted by identifying a set of data represented by a portion of the color image 320 and decrypting the set of data to generate the encoded information. In some cases, a first portion of the color image 320 may represent or display encrypted information and a second portion of the color image 320 may represent or display un-encrypted information. In one embodiment, the un-encrypted information may include a key wallet or software key container for protecting a decryption key.

In some cases, a color image may comprise a plurality of regions. In one example, each region of the plurality of regions may be assigned and colored a particular color. In another example, each region of the plurality of regions may be assigned a particular color and a particular symbol. For example, a first region may comprise a blue letter A, a second region may comprise a green letter Z, a third region may comprise a green triangle, and a fourth region may comprise a blue letter Z.

Figure 3C:
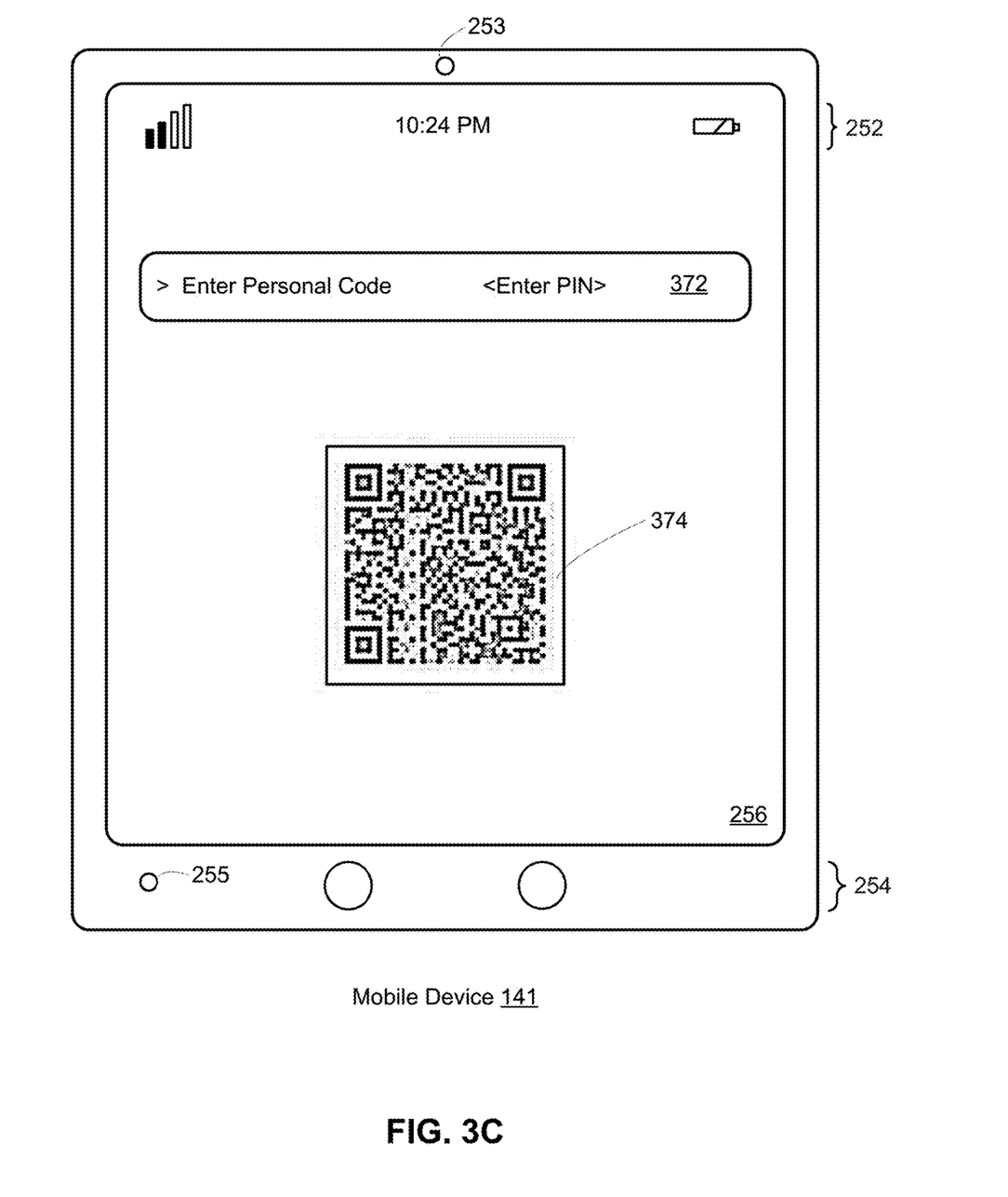
FIG. 3C depicts one embodiment of the mobile device executing an intelligent form filling application in order to automatically populate one or more data entry fields associated with a webpage or computing application.

FIG. 3C depicts one embodiment of the mobile device 141 of FIG. 2 executing an intelligent form filling application in order to automatically populate one or more data entry fields associated with a webpage or computing application (e.g., to automatically populate data entry fields 272-274 in FIG. 2). As depicted, the intelligent form filling application may prompt an end user of the mobile device 141 to capture an image 374 that encodes information within the image and to enter a personal code for decoding the image. After the end user has entered a personal code (e.g., a PIN) into data entry field 372, then the intelligent form filling application may generate the information encoded within the image and automatically fill or populate one or more data entry fields associated with a webpage or computing application with the information. In one embodiment, the personal code may be used to generate a decryption key using a key wallet. The key wallet may be stored on the mobile device or may be stored within the image 374 captured by the mobile device. After the decryption key has been generated, then the intelligent form filling application may decrypt the encrypted information stored within the image 374 using the decryption key. The information may include personal information, such as an email address or a Social Security number associated with a person, and billing information, such as a credit card number. The information may be tagged such that the intelligent form filling application may identify various types of information within the decoded information. In one example, a first tag may be used to identify an email address, a second tag may be used identify a shipping address, and a third tag may be used identify a credit card number. Using the information tags, the intelligent form filling application may map and enter a first text string associated with the first tag to a first data entry field associated with an email address (e.g., data entry field 274 in FIG. 2), map and enter a second text string associated with the second tag to a second data entry field associated with a shipping address (e.g., data entry field 273 in FIG. 2), and map and enter a third text string associated with the third tag to a third data entry field associated with a credit card number (e.g., data entry field 272 in FIG. 2).

Figure 4A:
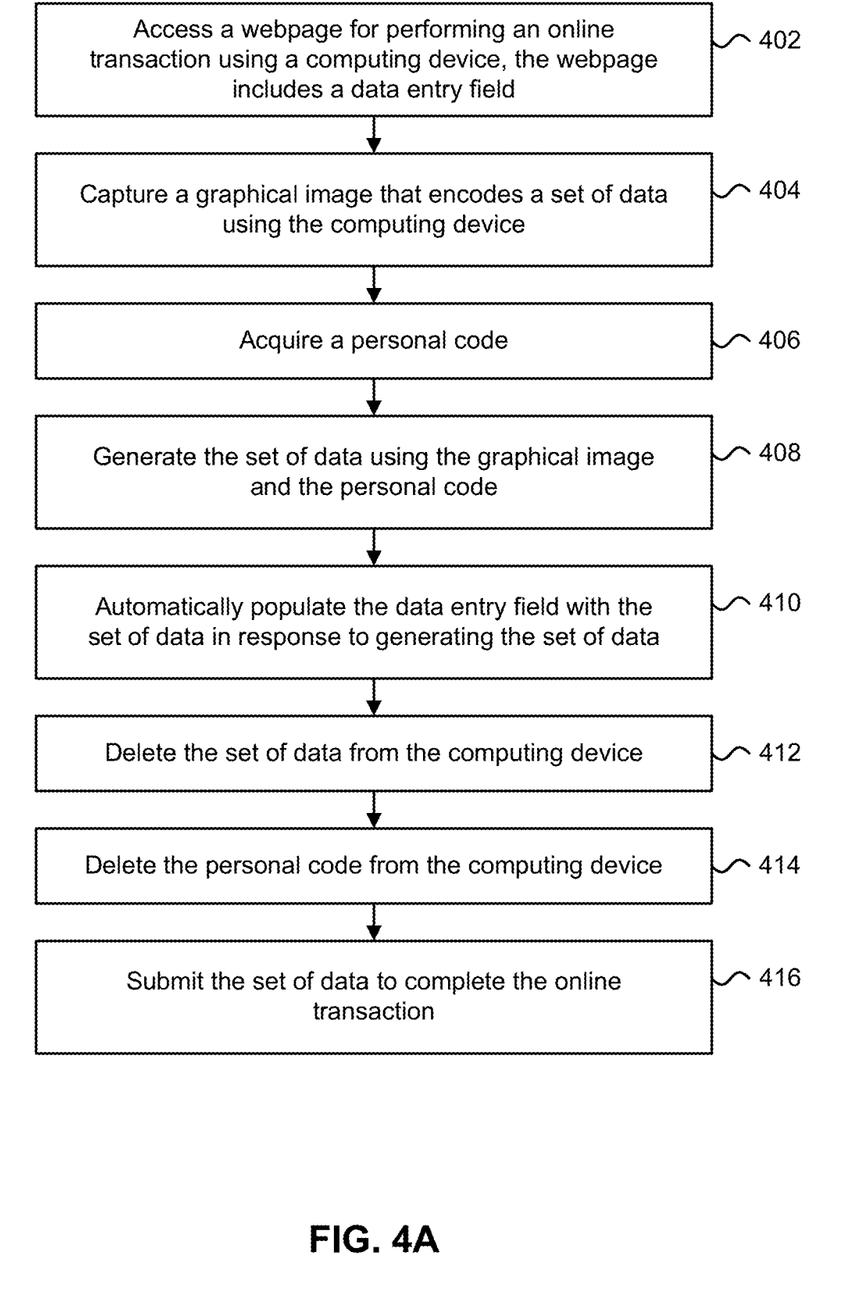
FIG. 4A is a flowchart describing one embodiment of a process for enabling secure transactions using a computing device.

FIG. 4A is a flowchart describing one embodiment of a process for enabling secure transactions using a computing device. In one embodiment, the process of FIG. 4A may be performed by a mobile device, such as mobile device 140 in FIG. 1.

In step 402, a webpage for performing an online transaction is accessed using a computing device. The webpage may include a data entry field, such as data entry field 274 in FIG. 2. The computing device may comprise a mobile computing device or a non-mobile computing device. The webpage may comprise a checkout page or a buying page for making an online purchase. The online transaction may comprise an online purchase of goods or services via an online merchant.

In step 404, an image that encodes a set of data is captured using the computing device. The image may be captured using a capturing device, a camera, or an image sensor integrated with the computing device. The image may comprise a color image, a black and white image, an image including text, a color QR code, or a black and white QR code. The image may comprise a graphical image or a still image that has been captured using a camera or an image sensor. The image may encode the set of data by encoding data that specifies the set of data. The image may include lines or symbols that are used to encode the set of data. In one embodiment, the set of data may comprise checkout information for completing the online transaction. The checkout information may include credit card information (e.g., credit card numbers and expiration dates), a billing address, a shipping address, an email address of the purchaser, a phone number of the purchaser, shipping contact information, shipping method information (e.g., next day delivery or ground delivery), and answers to security questions specific to the purchaser. In another embodiment, the set of data may comprise personal information, such as a Social Security number, a home address, an email address, and personal passwords for accessing online bank accounts and other online accounts (e.g., personal email accounts).

In step 406, a personal code is acquired. The personal code may correspond with a password or a PIN code that is used to protect a private key for decrypting encrypted information stored within the image. The personal code may be sent to an end user of the computing device from an issuing bank (e.g., the personal code may comprise a PIN that is sent to the end user via mail). In one embodiment, the computing device may prompt the end user for the personal code upon detecting a webpage that includes fillable data entry fields. In another embodiment, the computing device may request the personal code from the end user upon detection of one or more data entry fields within a webpage that correspond with checkout information.

In step 408, the set of data is generated using the image and the personal code. In one embodiment, the personal code may be used to decode the set of data that has been encoded within the image. In another embodiment, the personal code may be used to unlock or generate a decryption key that is used to decrypt the encrypted set of data that has been stored within the image. In one example, the decryption key may be generated by inputting the personal code to a software key container. The software key container may output the decryption key in response to the personal code being inputted to the software key container.

The image that encodes the set of data may store an encrypted version of the set of data within the image. In some embodiments, a decryption key for decrypting the encrypted set of data may be protected and stored in a key wallet or a software key container (e.g., a file, a portion of a file, a text string, or a binary string) using cryptographic camouflage techniques. In one example, a software key container for storing or generating a decryption key may be configured to receive an inputted PIN. If the inputted PIN is the correct PIN for unlocking the software key container, then the correct decryption key may be outputted from the software key container. However, if the inputted PIN is not the correct PIN for unlocking the software key container, then an incorrect decryption key that has attributes of a possible or plausible decryption key is outputted from the software key container. In some cases, the software key container itself may be embedded within the image. In this case, the computing device may acquire the software key container from the image, generate a decryption key using the software key container and the personal code, and then generate the set of data using the image and the decryption key.

In one embodiment, the decryption key may comprise a Digital Signature Algorithm (DSA) private key. In this case, the private key may comprise three parameters (p, a large prime, q, a smaller prime, and g, a number modulus p) and a private key x, which may be any number less than q. In one example, the DSA private key may be protected (such that decrypting it with any PIN produces a legitimate private key) by choosing x with the top bit clear and not encrypting the top bit.

In another embodiment, the decryption key may comprise an RSA private key. In this case, the private key may comprise a modulus n, which is a number of the form pq, where p and q are large primes, and a private exponent d, a number that is relatively prime to (p−1)(q−1). In one example, the RSA private key may be camouflaged by leaving the modulus n unencrypted, discarding the highest-order and lowest-order bits of d, and encrypting the remaining string using a key derived from a password or PIN using an encryption method that preserves length (e.g., using DES, padding the remaining string with random bits to a multiple of the block length when encrypting and maintaining a record of the length of the string in conjunction with the encrypted text). One characteristic of RSA private keys is that the private exponent d is odd. Another characteristic of the private exponent is that it is prime relative to (p−1)(q−1).

In step 410, the data entry field is automatically populated with the set of data in response to the set of data being generated. In one embodiment, the set of data may include tagging information that tags portions of the set of data as belonging to various data fields. In one example, a first tag within the set of data may be used to identify an email address within the set of data, a second tag within the set of data may be used identify a shipping address within the set of data, and a third tag within the set of data may be used identify a credit card number within the set of data. The data entry field may be associated with a field identifier that specifies the type of information to be entered into the data entry field (e.g., whether the data entry field is associated with a credit card number or an email address). The data entry field may be populated with a portion of the set of data based on the tagging information and the field identifier. In one example, if the field identifier corresponds with an email address, then the data entry field may be populated with a text string pointed to by the first tag. In another example, if the field identifier corresponds with a shipping address, then the data entry field may be populated with a text string pointed to by the second tag.

In step 412, the set of data is deleted from the computing device. In one example, the set of data may be deleted from the computing device once the set of data has been entered and submitted with the online transaction. In another example, the set of data may be deleted after the computing device has entered the set of data into the data entry field and transmitted the set of data to a server serving the webpage, but prior to completion of the online transaction. In step 414, the personal code is deleted from the computing device. Deleting the set of data (e.g., sensitive checkout information or personal information) and the personal code from the computing device after the online transaction has been completed may minimize the risk of sensitive information being acquired from the computing device if the computing device is ever lost or stolen.

In step 416, the set of data is submitted to complete the online transaction. In one example, after the data entry field has been populated with the set of data (e.g., credit card information has been entered into the data entry field), the online transaction may be completed by submitting the set of data (e.g., a checkout button or transaction submission button may be selected to complete the online transaction).

Figure 4B:
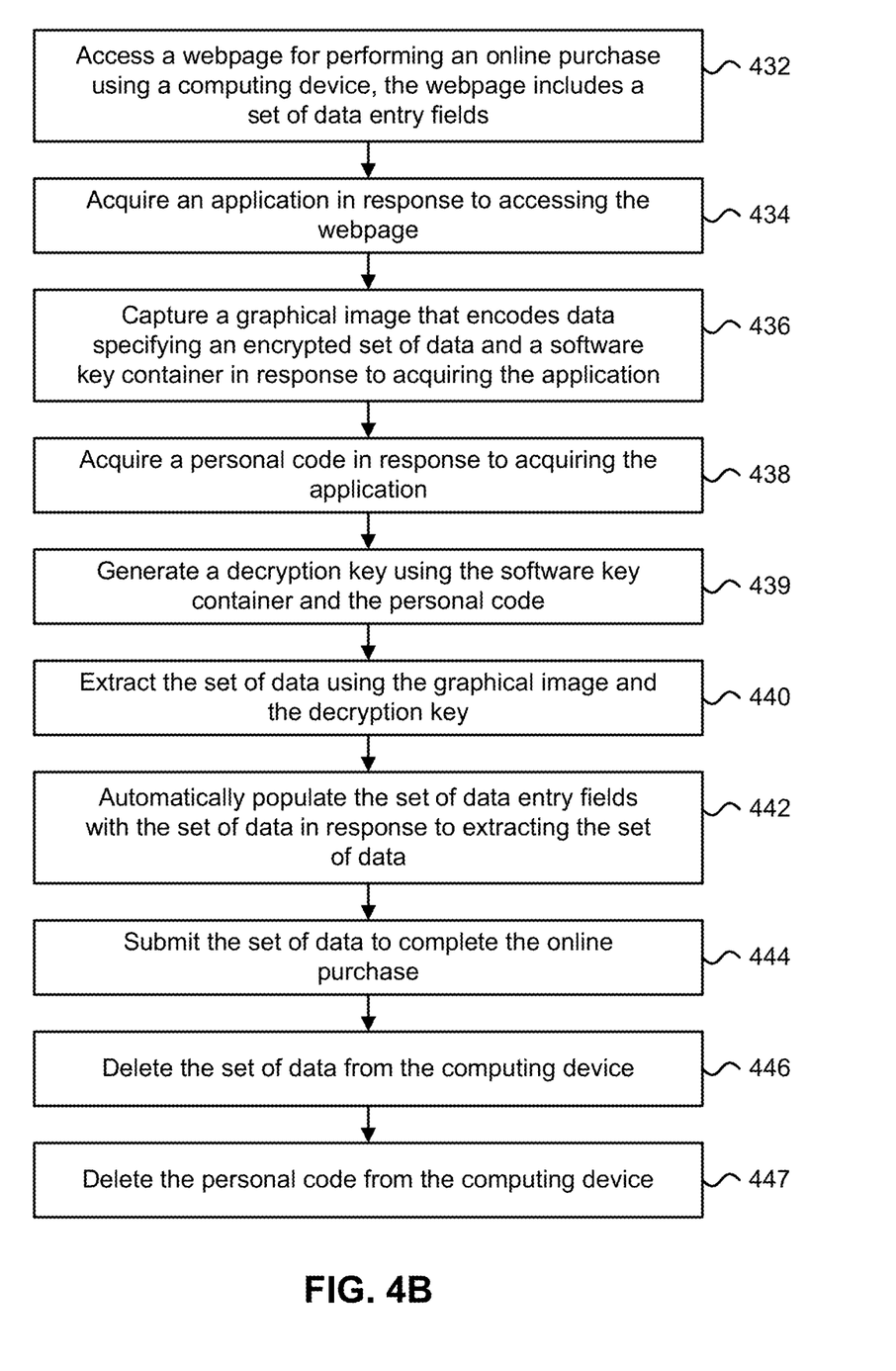
FIG. 4B is a flowchart describing another embodiment of a process for enabling secure transactions using a computing device.

FIG. 4B is a flowchart describing another embodiment of a process for enabling secure transactions using a computing device. In one embodiment, the process of FIG. 4B may be performed by a mobile device, such as mobile device 140 in FIG. 1.

In step 432, a webpage for performing an online purchase is accessed using a computing device. The website may be hosted by an online merchant. The webpage may include a set of data entry fields, such as data entry fields 272-274 in FIG. 2. The computing device may comprise a mobile computing device or a non-mobile computing device. The webpage may comprise a checkout page or a buying page for making the online purchase.

In step 434, an application is acquired in response to accessing the webpage. The application may be downloaded or transmitted to the computing device from a server, such as server 160 or server 170 in FIG. 1, by transmitting code or an executable file associated with the application. In one example, the application may be downloaded via JavaScript and be executed by a web browser used by the computing device to view the webpage.

In step 436, an image that includes an encrypted set of data and a software key container is captured. The image may comprise a graphical image or a still image that has been captured using a camera or an image sensor. The image may comprise a printed image that includes words and symbols. The image may encode the encrypted set of data and the software key container by encoding data that specifies the encrypted set of data and the software key container. In one embodiment, the image may be captured in response to acquiring the application. For example, the loading of the application into the computing device may prompt an end user of the computing device to capture the image. In another embodiment, the image may be captured by an end user of the computing device, which causes the computing device to prompt the end user for a personal code. The image may be captured using a capturing device, a camera, or an image sensor integrated with the computing device. The image may comprise a color image, a black and white image, an image including text, a color QR code, or a black and white QR code. In one embodiment, the set of data may comprise checkout information for completing the online purchase. The checkout information may include credit card information (e.g., credit card numbers and expiration dates), a billing address, a shipping address, an email address of the purchaser, a phone number of the purchaser, shipping contact information, shipping method information (e.g., next day delivery or ground delivery), and answers to security questions specific to the purchaser.

In step 438, a personal code is acquired in response to acquiring the application. The personal code may correspond with a password or a PIN code that is used to protect a private key for decrypting the encrypted set of data. The personal code may be sent to an end user of the computing device from an issuing bank (e.g., the personal code may comprise a PIN that is sent to the end user via mail). In one embodiment, the computing device may prompt the end user for the personal code upon detecting a webpage that includes fillable data entry fields.

In step 439, a decryption key is generated using the software key container and the personal code. In one example, the decryption key may be generated by inputting the personal code to the software key container. The software key container may then generate and output the decryption key in response to the personal code being inputted to the software key container. The image that includes the encrypted set of data may also store the software key container in an un-encrypted form or a plaintext form. In some embodiments, the decryption key for decrypting the encrypted set of data may be protected and stored in the software key container using cryptographic camouflage techniques. In one example, the software key container for storing and/or generating the decryption key may be configured to receive an inputted PIN. If the inputted PIN is the correct PIN for unlocking the software key container and retrieving the correct decryption key, then the correct decryption key may be outputted from the software key container. However, if the inputted PIN is not the correct PIN for unlocking the software key container, then an incorrect decryption key that has attributes of a possible or plausible decryption key is outputted from the software key container. In one example, if the inputted PIN is not the correct PIN for unlocking the software key container, then an incorrect decryption key that has one or more characteristics of a plausible decryption key (e.g., the incorrect decryption key may have the same string length as the correct decryption key or the same number of alphanumeric characters) is outputted from the software key container. In some cases, the software key container itself may be embedded within a portion of the image. In this case, the computing device may acquire the software key container from the image directly, generate the decryption key using the software key container and the acquired personal code, and then decrypt the encrypted set of data using the decryption key.

In one embodiment, the software key container may be configured to receive an inputted code and to generate the decryption key if the inputted code is the correct code for unlocking the decryption key and configured to generate a misleading decryption key if the inputted code is not the correct code for unlocking the decryption key. The misleading decryption key is different from the decryption key and is not a valid key for unlocking the decryption key. The misleading decryption key may comprise an invalid credential that is not able to decrypt the encrypted set of data. The misleading decryption key may comprise an invalid credential having attributes of the decryption key. The misleading decryption key may comprise attributes of a possible decryption key (e.g., may include a particular number of alphanumeric characters or be of a particular string length). Generating a misleading key that has attributes of a plausible decryption key may make it difficult for a hacker to determine the correct decryption key. In some embodiments, if the misleading or incorrect key is used as a decryption key to decrypt the encrypted set of data, then the application (e.g., an intelligent form filling application) may lockout and prevent future attempts to decrypt the encrypted set of data. In one example, an intelligent form filling application may allow three chances to enter the correct decryption key before preventing decryption of the encrypted set of data for at least a particular period of time (e.g., an hour).

In step 440, the set of data is extracted using the image and the decryption key. In one embodiment, the set of data is extracted by identifying and acquiring the encrypted set of data from the image and then decrypting the encrypted set of data using the decryption key. In step 442, the set of data entry fields is automatically populated with the set of data in response to extracting the set of data.

In one embodiment, the set of data may include tagging information that identifies a particular data field type for a particular portion of data within the set of data. In one example, a first tag within the set of data may be used to point to an email address within the set of data, a second tag within the set of data may be used to point to a shipping address within the set of data, and a third tag within the set of data may be used to point to a credit card number within the set of data. Each field of the set of data entry fields may be associated with a particular field identifier that specifies the type of information to be entered into the data entry field (e.g., whether the data entry field is associated with a credit card number or an email address). A data entry field may be populated with a portion of the set of data based on the tagging information and the field identifier for the data entry field. In one example, if the field identifier corresponds with an email address, then the data entry field may be populated with a text string pointed to by the first tag. In another example, if the field identifier corresponds with a shipping address, then the data entry field may be populated with a text string pointed to by the second tag.

In step 444, the set of data is submitted to complete the online purchase. In step 446, the set of data is deleted from the computing device. In one example, the set of data may be deleted from the computing device once the set of data has been entered and submitted with the online purchase. In another example, the set of data may be deleted within a first threshold period of time (e.g., two seconds) of the online purchase being completed or within a second threshold period of time (e.g., one second) of the set of data being submitted to complete the online purchase. In step 447, the personal code is deleted from the computing device. Deleting the set of data (e.g., sensitive checkout information or personal information) and the personal code from the computing device after an online transaction has been completed may minimize the risk of sensitive information being acquired from the computing device if the computing device is ever lost or stolen.

Figure 4C:
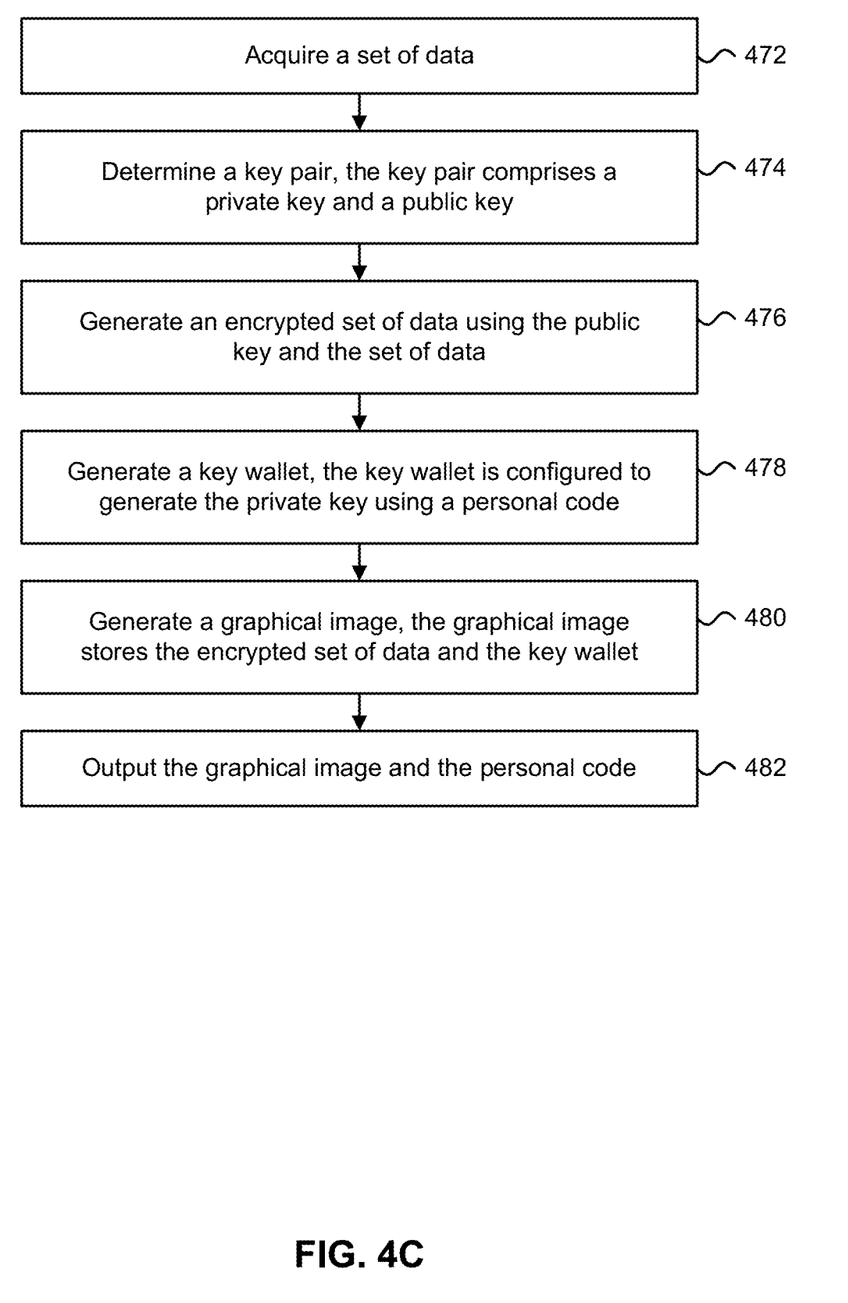
FIG. 4C is a flowchart describing one embodiment of a process for generating an image that encodes an encrypted set of data and a key wallet for generating a decryption key for decrypting the encrypted set of data.

FIG. 4C is a flowchart describing one embodiment of a process for generating an image that encodes an encrypted set of data and a key wallet for generating a decryption key for decrypting the encrypted set of data. In one embodiment, the process of FIG. 4C may be performed by a server, such as server 160 in FIG. 1.

In step 472, a set of data is acquired. In one embodiment, the set of data may comprise checkout information for completing an online purchase. The checkout information may include credit card information (e.g., credit card numbers and expiration dates), a billing address, a shipping address, an email address of the purchaser, a phone number of the purchaser, shipping contact information, shipping method information (e.g., next day delivery or ground delivery), and answers to security questions specific to the purchaser.

In step 474, a key pair is determined. The key pair may comprise a private key and a public key pair. In one embodiment, the key pair may comprise a PKI key pair. In step 476, an encrypted set of data is generated using the public key and the set of data. In step 478, a key wallet is generated. The key wallet may be configured to generate the private key using a personal code. In one embodiment, the key wallet may protect the private key using cryptographic camouflage techniques. In step 480, an image is generated. In one embodiment, the image may store the encrypted set of data. In another embodiment, the image may store both the encrypted set of data and the key wallet. The image may be generated using the encrypted set of data. In some cases, the encrypted set of data may be represented by a bit string comprising a plurality of bits and the plurality of bits may be mapped to a plurality of colors. In one example, every two bits in the bit string may be grouped together and assigned to one of four colors. In another example, every four bits in the bit string may be grouped together and assigned to one of 16 colors. The image may then be generated using the plurality of colors. In some cases, the image may comprise a color image, a black and white image, an image including text, a color QR code, or a black and white QR code. In step 482, the image and the personal code may be outputted. In one embodiment, the image may be printed to or integrated with a banking card and mailed to a card holder. In another embodiment, the image may be printed to or displayed using a sticker, which may be affixed to a banking card. The image may comprise a graphical image or a still image. The personal code may comprise a PIN that is sent to card holders apart from the banking card.

One embodiment of the disclosed technology includes acquiring an image at the computing device, the image comprises an encrypted set of data and a software key container, the method further includes acquiring a personal code at the computing device, generating a decryption key using the software key container and the personal code, generating a set of data using the encrypted set of data and the decryption key, and automatically populating a set of data entry fields with the set of data using the computing device. In some cases, the software key container generates the decryption key using cryptographic camouflage techniques. The software key container may be configured to receive an inputted code and to generate the decryption key if the inputted code is the correct code for unlocking the decryption key. The software key container may be configured to generate a misleading decryption key if the inputted code is not the correct code for unlocking the decryption key, the misleading decryption key comprises attributes of a possible decryption key.

One embodiment of the disclosed technology includes a processor in communication with an image capturing device. The image capturing device is configured to capture an image, the image comprises an encrypted set of data and a software key container. The processor is configured to acquire the image and a personal code, to generate a decryption key using the software key container and the personal code, to generate a set of data using the encrypted set of data and the decryption key, and to automatically populate a set of data entry fields with the set of data in response to generating the set of data.

One embodiment comprises a computer program product comprising a computer readable storage medium having computer readable program code embodied therewith. The computer readable program code configured to access a webpage for performing an online transaction using a computing device, the webpage comprises a set of data entry fields, the computer readable program code configured to capture an image using the computing device, the image comprises an encrypted set of data and a software key container, the software key container protects a decryption key using cryptographic camouflage techniques, the computer readable program code configured to acquire a personal code in response to capturing the image and to generate the decryption key using the software key container and the personal code, the computer readable program code configured to generate a set of data using the encrypted set of data and the decryption key and to automatically populate the set of data entry fields with the set of data in response to generating the set of data, the computer readable program code configured to submit the set of data to complete the online transaction.

Figure 5:
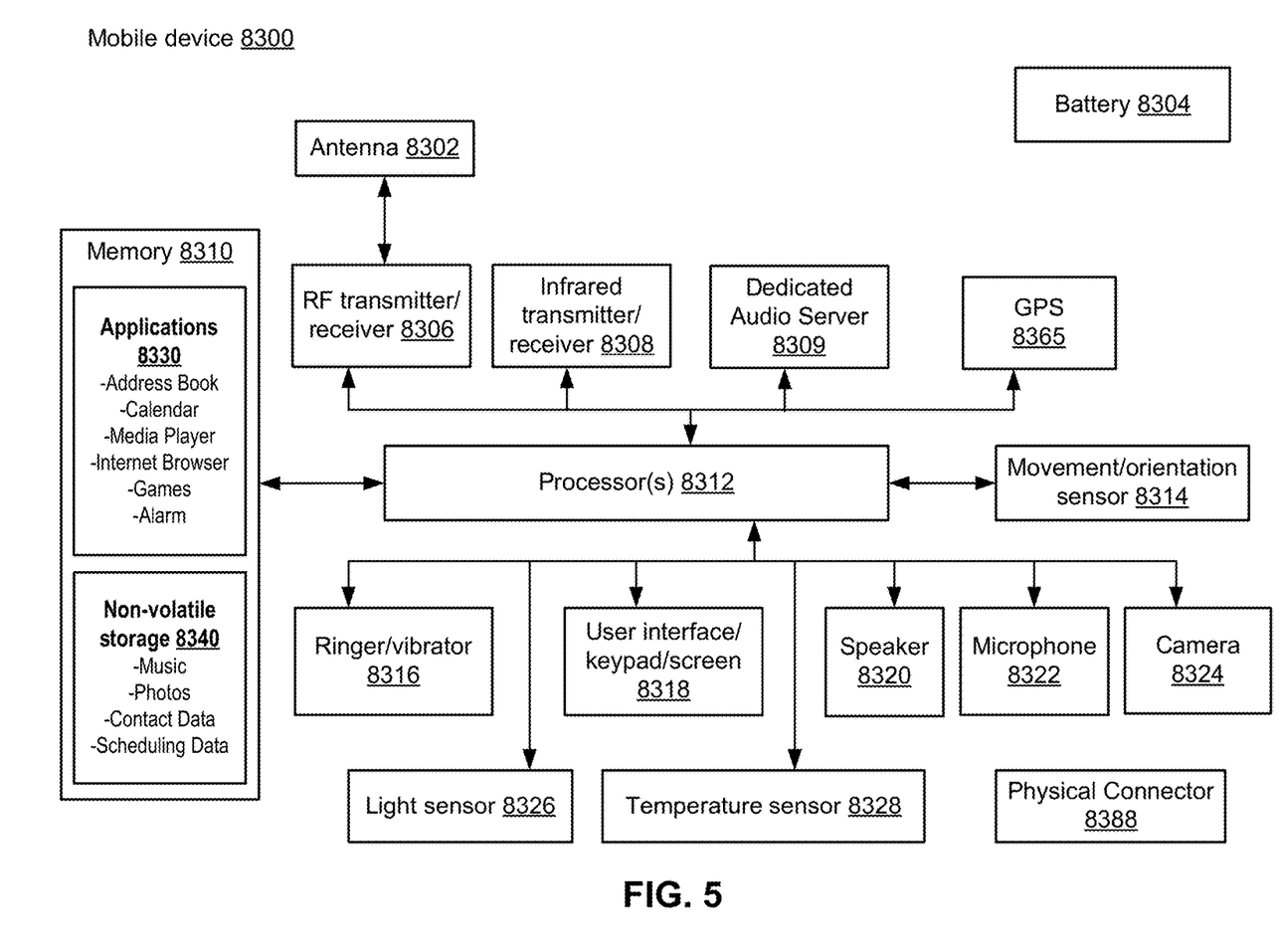
FIG. 5 depicts one embodiment of a mobile device.

The disclosed technology may be used with various computing systems. FIG. 5 depicts one embodiment of a mobile device 8300, which includes one example of an implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" may be used to described different embodiments and do not necessarily refer to the same embodiment.

For purposes of this document, a connection can be a direct connection or an indirect connection (e.g., via another part).

For purposes of this document, the term "set" of objects refers to a "set" of one or more of the objects.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method using a mobile computing device that includes a hardware memory, a hardware processor, and an image sensor, the method comprising:
    acquiring, by the mobile computing device, a webpage associated with an online transaction from a server in communication with the mobile computing device, wherein the webpage comprises a set of data entry fields;
    capturing, by the image sensor of the mobile computing device, a graphical image;
    storing, in the hardware memory, the captured graphical image;
    extracting, by the hardware processor, from the stored graphical image an encrypted set of data and a software key container;
    acquiring, by the hardware processor, a personal code associated with an end user of the mobile computing device;
    generating, by the hardware processor, a decryption key using the extracted software key container and the acquired personal code;
    decrypting, by the hardware processor, the encrypted set of data using the decryption key;
    generating, by the hardware processor, a second set of data from the decrypted set of data;
    storing, in the hardware memory, the second set of data and the personal code;
    populating, by the hardware processor, the set of data entry fields with the second set of data;
    transmitting, by the hardware processor, the set of data entry fields populated with the second set of data from the mobile computing device to the server serving the webpage; and
    deleting, by the hardware processor, the second set of data and the personal code from the hardware memory subsequent to transmission of the second set of data from the mobile computing device to the server and prior to completion of the online transaction.

2. The method of claim 1, wherein:
the software key container secures the decryption key using cryptographic camouflage techniques.

3. The method of claim 1, further comprising:
receiving, by the hardware processor, an inputted code;
determining, by the hardware processor, that the inputted code is a correct code for unlocking the decryption key; and
generating, by the hardware processor, the decryption key based on the determination that the inputted code is the correct code for unlocking the decryption key.

4. The method of claim 3, further comprising:
determining, by the hardware processor, that the inputted code is not the correct code for unlocking the decryption key; and
generating, by the hardware processor, a second decryption key based on the determination that the inputted code is not the correct code for unlocking the decryption key, the second decryption key is different from the decryption key, the second decryption key comprises an invalid credential having attributes of the decryption key.

5. The method of claim 1, wherein:
the graphical image comprises a color image.

6. The method of claim 5, wherein:
the color image comprises a color QR code, the color QR code displays a plurality of different colors.

7. The method of claim 1, wherein:
the graphical image comprises a first portion of the graphical image that comprises the software key container and a second portion of the graphical image different from the first portion that comprises the encrypted set of data.

8. The method of claim 1, further comprising:
submitting the second set of data to the server subsequent to populating the set of data entry fields with the second set of data using the hardware processor.

9. A non-transitory computer readable medium, of a mobile computing device comprising a hardware memory, a hardware processor and an image sensor, having program instructions stored therein, when executed by the hardware processor causes the hardware processor to perform the steps of:
    acquiring, by the hardware processor, a webpage associated with an online transaction from a server in communication with the mobile computing device, wherein the webpage comprises a set of data entry fields;
    capturing, by the image sensor of the mobile computing device, a graphical image;
    storing, in the hardware memory, the captured graphical image;
    extracting, by the hardware processor, from the stored graphical image an encrypted set of data and a software key container;
    acquiring, by the hardware processor, a personal code associated with an end user of the mobile computing device;
    generating, by the hardware processor, a decryption key using the extracted software key container and the acquired personal code;
    decrypting, by the hardware processor, the encrypted set of data using the decryption key;
    generating, by the hardware processor, a second set of data from the decrypted set of data;
    storing, in the hardware memory, the second set of data and the personal code;
    populating, by the hardware processor, the set of data entry fields with the second set of data;
    transmitting, by the hardware processor, the set of data entry fields populated with the second set of data from the mobile computing device to the server serving the webpage; and
    deleting, by the hardware processor, the second set of data and the personal code from the hardware memory subsequent to transmission of the second set of data from the mobile computing device to the server.

10. The non-transitory computer readable medium of claim 9, wherein:
the software key container secures the decryption key using cryptographic camouflage techniques.

11. A mobile computing device, comprising:
an image capturing device that captures a graphical image;
a hardware memory that stores the captured graphical image;
a hardware processor; and
a non-transitory computer readable medium having program instructions stored therein, when executed by the hardware processor causes the hardware processor to perform the steps of:
acquiring, by the hardware processor, a webpage associated with an online transaction from a server in communication with the mobile computing device, wherein the webpage comprises a set of data entry fields;
storing, in the hardware memory, the captured graphical image;
extracting, by the hardware processor, from the stored graphical image an encrypted set of data and a software key container;
acquiring, by the hardware processor, a personal code associated with an end user of the mobile computing device;
generating, by the hardware processor, a decryption key using the extracted software key container and the acquired personal code;
decrypting, by the hardware processor, the encrypted set of data using the decryption key;
generating, by the hardware processor, a second set of data from the decrypted set of data;
storing, in the hardware memory, the second set of data and the personal code;
populating, by the hardware processor, the set of data entry fields with the second set of data;
transmitting, by the hardware processor, the set of data entry fields populated with the second set of data from the mobile computing device to the server serving the webpage; and
deleting, by the hardware processor, the second set of data and the personal code from the hardware memory subsequent to transmission of the second set of data from the mobile computing device to the server.

12. The mobile computing device of claim 11, wherein:
the software key container secures the decryption key using cryptographic camouflage techniques.

13. The mobile computing device of claim 11, wherein:
the graphical image comprises a color image.

14. The mobile computing device of claim 11, wherein:
the graphical image comprises a first portion of the graphical image that comprises the software key container and a second portion of the graphical image different from the first portion that comprises the encrypted set of data.

* * * * *